US011341071B1

(12) United States Patent
Raineri et al.

(10) Patent No.: US 11,341,071 B1
(45) Date of Patent: May 24, 2022

(54) ARBITRATING SERIAL BUS ACCESS

(71) Applicant: Dell Products L.P., Round Rock, TX (US)

(72) Inventors: Michael Alexander Raineri, Westborough, MA (US); James Creighton Tryhubczak, Cumberland, RI (US); Stephen Edward Strickland, Foxborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/235,396

(22) Filed: Apr. 20, 2021

(51) Int. Cl.
*G06F 13/374* (2006.01)

(52) U.S. Cl.
CPC .................. *G06F 13/374* (2013.01)

(58) Field of Classification Search
CPC .............. G06F 13/364; G06F 13/374
See application file for complete search history.

(56) References Cited

U.S. PATENT DOCUMENTS

| | | | |
|---|---|---|---|
| 5,909,558 A * | 6/1999 | Linzmeier ............. | G06F 13/374 710/107 |
| 7,380,043 B1 | 5/2008 | Warnakulasooriya et al. | |
| 2006/0179196 A1 * | 8/2006 | Gray ................... | G06F 13/1663 710/240 |
| 2010/0082814 A1 * | 4/2010 | Plache ................. | H04L 67/322 709/226 |
| 2010/0174840 A1 * | 7/2010 | Blainey ................ | G06F 9/5016 710/121 |
| 2015/0254198 A1 * | 9/2015 | Anderson ............. | G06F 13/364 710/110 |
| 2016/0239371 A1 * | 8/2016 | Jose ...................... | G06F 11/079 |
| 2018/0365184 A1 * | 12/2018 | van Wensen ......... | G06F 13/364 |

OTHER PUBLICATIONS

Lambert, Tim et al. U.S. Appl. No. 17/142,944, filed Jan. 6, 2021, titled "Single-and Multi-Channel, Multi-Latency Payload Bus".

* cited by examiner

*Primary Examiner* — Phong H Dang
(74) *Attorney, Agent, or Firm* — Baker Botts L.L.P.

(57) ABSTRACT

Identifying a first controller and a second controller each connected to a computing device over a first serial bus for monitoring of the computing device; allocating, at the first controller, i) a first internal register bit of a first register indicating an arbitration status of the first controller with respect to the computing device and ii) a second internal register bit of the first register indicating an arbitration status of the second controller with respect to the computing device; allocating, at the second controller, i) a third internal register bit of a second register indicating the arbitration status of the first controller with respect to the computing device and ii) a fourth internal register bit of the second register indicating the arbitration status of the second controller with respect to the computing device.

20 Claims, 5 Drawing Sheets

ARBITRATING SERIAL BUS ACCESS

BACKGROUND

Field of the Disclosure

The disclosure relates generally to an information handling system, and in particular, arbitrating serial bus access to computing components of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of identifying a first controller and a second controller each connected to a computing device over a first serial bus for monitoring of the computing device; allocating, at the first controller, i) a first internal register bit of a first register indicating an arbitration status of the first controller with respect to the computing device and ii) a second internal register bit of the first register indicating an arbitration status of the second controller with respect to the computing device; allocating, at the second controller, i) a third internal register bit of a second register indicating the arbitration status of the first controller with respect to the computing device and ii) a fourth internal register bit of the second register indicating the arbitration status of the second controller with respect to the computing device; transmitting, by the first controller and to the second controller over a second serial bus, the arbitration status of the first controller with respect to the computing device as indicated by the first internal register bit of the first register; updating, at the second controller and based on the first internal register bit of the first register, the third internal register bit of the second register indicating the arbitration status of the first controller with respect to the computing device; transmitting, by the second controller and to the first controller over the second serial bus, the arbitration status of the second controller with respect to the computing device as indicated by the fourth internal register bit of the second register; and updating, at the first controller and based on the fourth internal bit of the second register, the second internal register bit of the first register indicating the arbitration status of the second controller with respect to the computing device.

Other embodiments of these aspects include corresponding systems, apparatus, and computer programs, configured to perform the actions of the methods, encoded on computer storage devices.

These and other embodiments may each optionally include one or more of the following features. For instance, the first controller and the second controller are each connected to an additional computing device over a third serial bus for monitoring of the additional computing device, the method further including allocating, at the first controller, i) a fifth internal register bit of the first register indicating an arbitration status of the first controller with respect to the additional computing device and ii) a sixth internal register bit of the first register indicating an arbitration status of the second controller with respect to the additional computing device; allocating, at the second controller, i) a seventh internal register bit of the second register indicating the arbitration status of the first controller with respect to the additional computing device and ii) an eighth internal register bit of the second register indicating the arbitration status of the second controller with respect to the additional computing device; transmitting, by the first controller and to the second controller over the second serial bus, the arbitration status of the first controller with respect to the additional computing device as indicated by the fifth internal register bit of the first register; updating, at the second controller and based on the fifth internal register bit of the first register, the seventh internal register bit of the second register indicating the arbitration status of the first controller with respect to the additional computing device; transmitting, by the second controller and to the first controller over the second serial bus, the arbitration status of the second controller with respect to the additional computing device as indicated by the eighth internal register bit of the second register; and updating, at the first controller and based on the eighth internal bit of the second register, the sixth internal register bit of the first register indicating the arbitration status of the second controller with respect to the additional computing device. The arbitration status of the first controller with respect to the computing device is an arbitration out status of the first controller for access to the computing device over the first serial bus. The arbitration status of the second controller with respect to the computing device is an arbitration out status of the second controller for access to the computing device over the first serial bus. Accessing, by the first controller and over the first serial bus, the computing device based on the first internal register bit and the second internal register bit of the first register. Accessing, by the second controller and over the first serial bus, the computing device based on the third internal register bit and the fourth internal register bit of the second register. The second serial bus is a shared serial bus between the first controller and the second controller.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
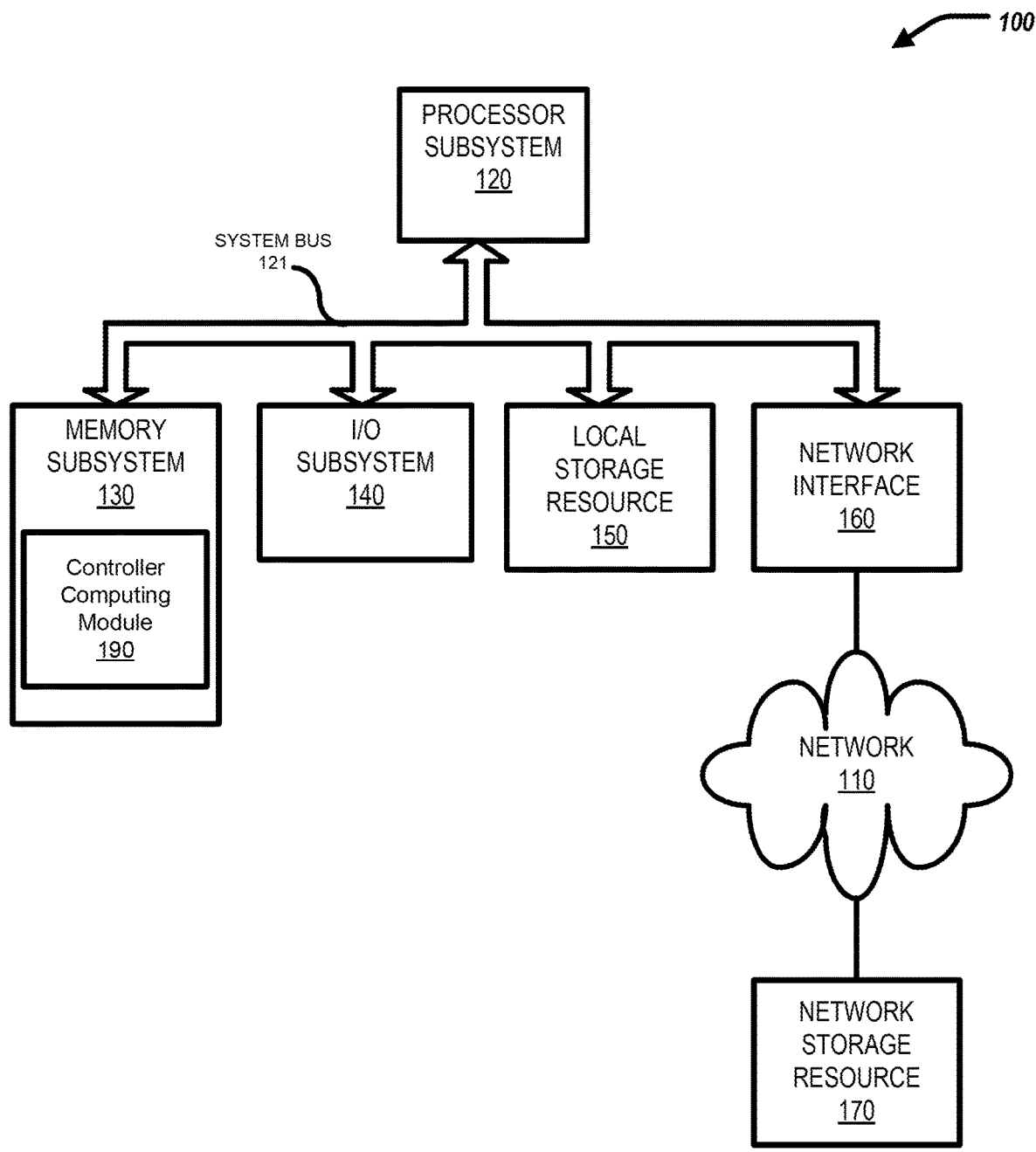
FIG. 1 is a block diagram of selected elements of an embodiment of an information handling system.

This disclosure discusses methods and systems for arbitrating serial bus access to computing components. In short, a shared serial bus can be utilized between controller computing modules of separate information handling systems for exchanging arbitration state information Specifically, this disclosure discusses a system and a method for identifying a first controller and a second controller each connected to a computing device over a first serial bus for monitoring of the computing device; allocating, at the first controller, i) a first internal register bit of a first register indicating an arbitration status of the first controller with respect to the computing device and ii) a second internal register bit of the first register indicating an arbitration status of the second controller with respect to the computing device; allocating, at the second controller, i) a third internal register bit of a second register indicating the arbitration status of the first controller with respect to the computing device and ii) a fourth internal register bit of the second register indicating the arbitration status of the second controller with respect to the computing device; transmitting, by the first controller and to the second controller over a second serial bus, the arbitration status of the first controller with respect to the computing device as indicated by the first internal register bit of the first register; updating, at the second controller and based on the first internal register bit of the first register, the third internal register bit of the second register indicating the arbitration status of the first controller with respect to the computing device; transmitting, by the second controller and to the first controller over the second serial bus, the arbitration status of the second controller with respect to the computing device as indicated by the fourth internal register bit of the second register; and updating, at the first controller and based on the fourth internal bit of the second register, the second internal register bit of the first register indicating the arbitration status of the second controller with respect to the computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a controller computing module 190. The controller computing module 190 can be included by the memory subsystem 130. The controller computing module 190 can include a computer-executable program (software). The controller computing module 190 can be executed by the processor subsystem 120.

In short, a shared serial bus can be utilized between controller computing modules of separate information handling systems for exchanging arbitration state information.

Figure 2:
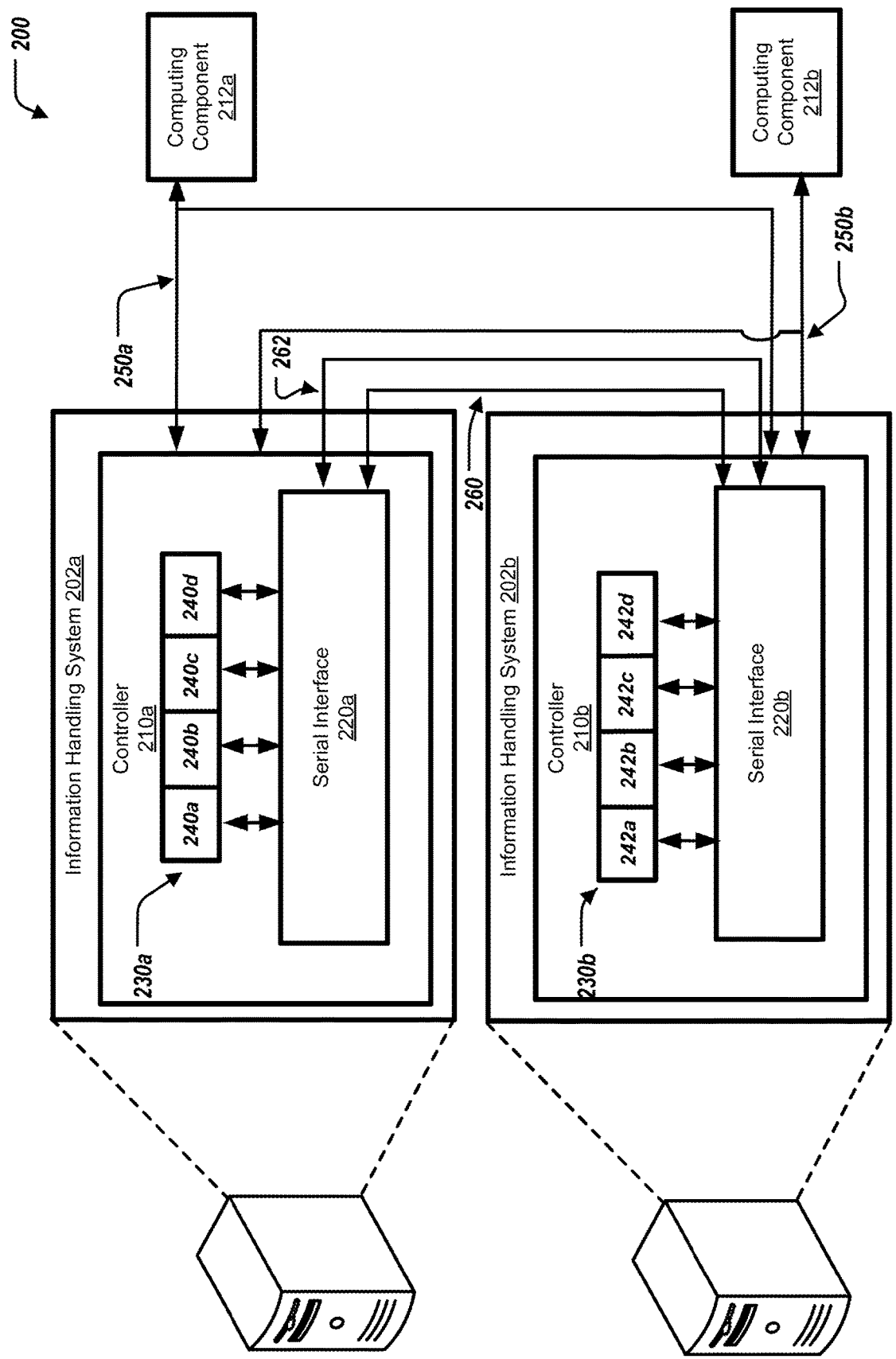
FIG. 2 illustrates a block diagram of an information handling system for arbitrating serial bus access to computing components of the information handling system.

Turning to FIG. 2, FIG. 2 illustrates an environment 200 including a first information handling system 202a, a second information handling system 202b (collectively referred to as information handling systems 202), and computing components 212a, 212b (collectively referred to as computing components 212. The first information handling system 202a can include a first controller 210a. The information handling system 202a can initiate an arbitration request to controller 210a. The second information handling system 220b can include a second controller 210b. The information handling system 202 can initiate an arbitration request to the controller 210b. In some examples, the information handling system 202a and/or 202b is similar to, or includes, the information handling system 100 of FIG. 1. In some examples, the first controller 210a and/or the second controller 210b is the same, or substantially the same, as the controller 190 of FIG. 1. In some examples, the computing components 212 can include a power supply unit, a fan, or a storage device. In some examples, the environment 200 can include any number of information handling systems 202.

The first controller 210a can include a serial interface 220a, and a first internal register 230a. The first controller 210a can further include internal register bits 240a, 240b, 240c, 240d. The second controller 210b can include a serial interface 220b, and a second internal register 230b. The second controller 210b can further include register bits 242a, 242b, 242c, 242d. In some examples, the serial interfaces 220a, 220b can include a shifty bus serial interface, a super shifty bus serial interface, or any type of serial interface. Example serial interfaces 220*a*, 220*b* can be described in U.S. patent application Ser. No. 17/142,944, which is incorporated herein by reference.

The controllers 210*a*, 210*b* (collectively referred to as controllers 210) can be in communication with the computing component 212*a* over a first serial bus 250*a*. The controllers 210 can be in communication with the computing component 212*b* over a second serial bus 250*b*. Example serial buses 250*a*, 250*b* can be described in U.S. Pat. No. 7,380,043, which is incorporated herein by reference.

The first controller 210*a* can be in communication with the second controller 210*b* over an arbitration serial bus 260. The arbitration serial bus 260 can be a shared serial bus between the first controller 210*a* and the second controller 210*b*. In some examples, the first controller 210*a* can further be in communication with the second controller 210*b* over a secondary, or redundant, arbitration serial bus 262 that is a shared serial bus between the first controller 210*a* and the second controller 210*b*. The secondary, or redundant, arbitration serial bus 262 can be implemented as a backup were the arbitration serial bus 260 fail.

The controllers 210 can monitor the computing components 212 over respective serial busses 250. That is, the controllers 210 can monitor the computing component 212*a* over the serial bus 250*a*; and monitor the computing component 212*b* over the serial bus 250*b*.

The first controller 210*a*, and specifically, the serial interface 220*a*, can allocate the internal register bit 240*a* of the first internal register 230*a* to indicate an arbitration status of the first controller 210*a* with respect to the computing component 212*a*. Moreover, the first controller 210*a*, and specifically, the serial interface 220*a*, can allocate the internal register bit 240*b* of the first internal register 230*a* to indicate an arbitration status of the second controller 210*b* with respect to the computing component 212*a*. Additionally, the first controller 210*a*, and specifically, the serial interface 220*a*, can allocate the internal register bit 240*c* of the first internal register 230*a* to indicate an arbitration status of the first controller 210*a* with respect to the computing component 212*b*. Moreover, the first controller 210*a* can allocate the internal register bit 240*d* of the first internal register 230*a* to indicate an arbitration status of the second controller 210*b* with respect to the computing component 212*b*.

The second controller 210*b*, and specifically, the serial interface 220*b*, can allocate the internal register bit 242*a* of the second internal register 230*b* to indicate an arbitration status of the first controller 210*a* with respect to the computing component 212*a*. Moreover, the second controller 210*b*, and specifically, the serial interface 220*b*, can allocate the internal register bit 242*b* of the second internal register 230*b* to indicate an arbitration status of the second controller 210*b* with respect to the computing component 212*a*. Additionally, the second controller 210*b*, and specifically, the serial interface 220*b*, can allocate the internal register bit 242*c* of the second internal register 230*b* to indicate an arbitration status of the first controller 210*a* with respect to the computing component 212*b*. Moreover, the second controller 210*b*, and specifically, the serial interface 220*b*, can allocate the internal register bit 242*d* of the second internal register 230*b* to indicate an arbitration status of the second controller 210*b* with respect to the computing component 212*b*.

To that end, the arbitration status of the controllers 210 with respect to the computing components 212 is an arbitration out status of the controllers 210 for access to the computing component 212 over the respective serial bus 250. For example, the arbitration status of the first controller 210*a* with respect to the computing component 212*a* is an arbitration out status of the first controller 210*a* for access to the computing component 212*a* over the serial bus 250*a*; and the arbitration status of the first controller 210*a* with respect to the computing component 212*b* is an arbitration out status of the first controller 210*a* for access to the computing component 212*b* over the serial bus 250*b*. For example, the arbitration status of the second controller 210*b* with respect to the computing component 212*a* is an arbitration out status of the second controller 210*b* for access to the computing component 212*a* over the serial bus 250*a*; and the arbitration status of the second controller 210*b* with respect to the computing component 212*b* is an arbitration out status of the second controller 210*b* for access to the computing component 212*b* over the serial bus 250*b*.

The first controller 210*a*, and specifically, the serial interface 220*a*, can transmit to the second controller 210*b* over the arbitration serial bus 260 the arbitration status of the first controller 210*a* with respect to the computing component 212*a* as indicated by the internal register bit 240*a* of the first internal register 230*a*. Furthermore, the first controller 210*a*, and specifically, the serial interface 220*a*, can transmit to the second controller 210*b* over the arbitration serial bus 260 the arbitration status of the first controller 210*a* with respect to the computing component 212*b* as indicated by the internal register bit 240*c* of the first internal register 230*a*.

The second controller 210*b*, and specifically, the serial interface 220*b*, in response to receiving the arbitration status of the first controller 210*a* with respect to the computing component 212*a* as indicated by the internal register bit 240*a* of the first internal register 230*a*, can update the internal register bit 242*a* of the second internal register 230*b* to indicate the arbitration status of the first controller 210*a* with respect to the computing component 212*a*. Furthermore, the second controller 210*b*, and specifically, the serial interface 220*b*, in response to receiving the arbitration status of the first controller 210*a* with respect to the computing component 212*b* as indicated by the internal register bit 240*c* of the first internal register 230*a*, can update the internal register bit 242*c* of the second internal register 230*b* to indicate the arbitration status of the first controller 210*a* with respect to the computing component 212*b*.

The second controller 210*b*, and specifically, the serial interface 220*b*, can transmit to the first controller 210*a* over the arbitration serial bus 260 the arbitration status of the second controller 210*b* with respect to the computing component 212*a* as indicated by the internal register bit 242*b* of the second internal register 230*b*. Furthermore, the second controller 210*b*, and specifically, the serial interface 220*b* can transmit to the first controller 210*a* over the arbitration serial bus 260 the arbitration status of the second controller 210*b* with respect to the computing component 212*b* as indicated by the internal register bit 240*d* of the second internal register 230*b*.

The first controller 210*a*, and specifically, the serial interface 220*a*, in response to receiving the arbitration status of the second controller 210*b* with respect to the computing component 212*a* as indicated by the internal register bit 240*b* of the second internal register 230*b*, can update the internal register bit 240*b* of the first internal register 230*a* to indicate the arbitration status of the second controller 210*b* with respect to the computing component 212*a*. Furthermore, the first controller 210*a*, and specifically, the serial interface 220*a*, in response to receiving the arbitration status of the second controller 210*b* with respect to the computing component 212*b* as indicated by the internal register bit 242*d* of the second internal register 230*b*, can update the internal register bit 240*d* of the first internal register 230*a* to indicate the arbitration status of the second controller 210*b* with respect to the computing component 212*b*.

In some examples, the first controller 210*a* can access, over the serial bus 250*a*, the computing component 212*a* based on the arbitration status of the internal register bits 240*a*, 240*b* of the first internal register 230*a*. That is, the arbitration out status of the internal register bit 240*a* can indicate that first controller 210*a* has access to the computing component 212*a* and that the internal register bit 240*b* indicates that the second controller 210*b* does not have access to the computing component 212*a*.

In some examples, the first controller 210*a* can access, over the serial bus 250*b*, the computing component 212*b* based on the arbitration status of the internal register bits 240*c*, 240*d* of the first internal register 230*a*. That is, the arbitration out status of the internal register bit 240*c* can indicate that first controller 210*a* has access to the computing component 212*b* and that the internal register bit 240*d* indicates that the second controller 210*b* does not have access to the computing component 212*b*.

In some examples, the second controller 210*b* can access, over the serial bus 250*a*, the computing component 212*a* based on the arbitration status of the internal register bits 242*a*, 242*b* of the second internal register 230*b*. That is, the arbitration out status of the internal register bit 242*a* can indicate that first controller 210*a* does not have access to the computing component 212*a* and that the internal register bit 242*b* indicates that the second controller 210*b* does have access to the computing component 212*a*.

In some examples, the second controller 210*b* can access, over the serial bus 250*b*, the computing component 212*b* based on the arbitration status of the internal register bits 242*c*, 242*d* of the second internal register 230*b*. That is, the arbitration out status of the internal register bit 242*c* can indicate that first controller 210*a* does not has access to the computing component 212*b* and that the internal register bit 242*d* indicates that the second controller 210*b* does have access to the computing component 212*b*.

Figure 3:
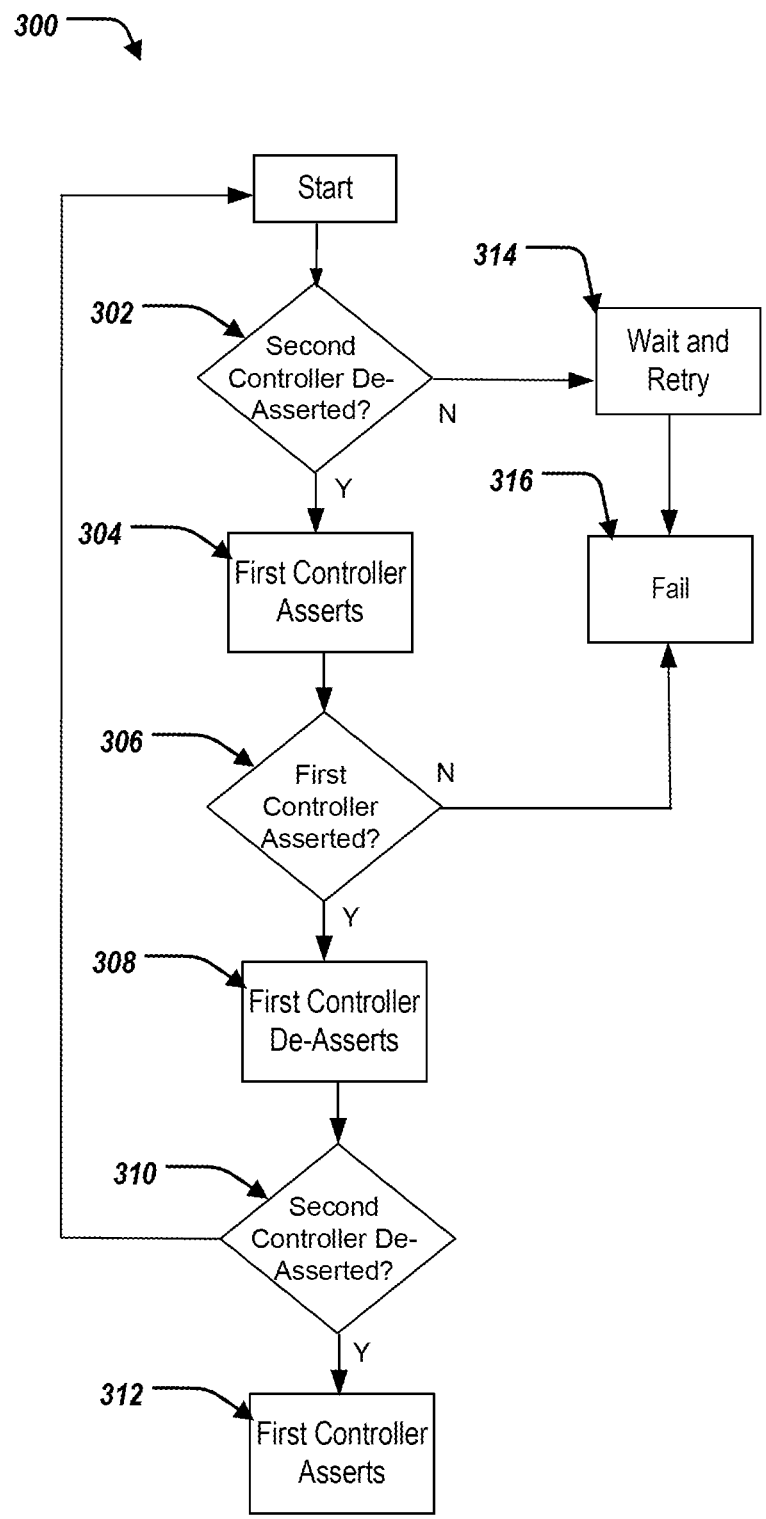
FIGS. 3-5 illustrate respective methods for arbitrating serial bus access to computing components of the information handling system.

FIG. 3 illustrates a flowchart depicting selected elements of an embodiment of a method 300 for arbitrating serial bus access to computing components of the information handling system. The method 300 may be performed by the information handling system 100, the information handling systems 202 and/or the controllers 210, and with reference to FIGS. 1-2. It is noted that certain operations described in method 300 may be optional or may be rearranged in different embodiments.

The first controller 210*a* can determine if the internal register bit 240*b* indicates that the second controller 210*b* is not accessing the serial bus 250*a* ("de-asserted"), at 302. When the first controller 210*a* determines that the internal register bit 240*b* indicates that the second controller 210*b* is not accessing the serial bus 250*a* ("de-asserted"), the first controller 210*a* toggles the internal register bit 240*a* to access the serial bus 250*a* ("asserted") for a period of x seconds, at 304. For example, x seconds can be 20 microseconds or 40 microseconds (e.g., based on the first controller 210*a* or the second controller 210*b*). The second controller 210*b* determines if the internal register bit 242*b* indicates that the first controller 210*a* is not accessing the serial bus 250*a* ("asserted"), at 306. For example, the first controller 210*a*, and specifically, the serial interface 220*a*, can provide the arbitration status of the first controller 210*a* with respect to the computing component 212*a* as indicated by the internal register bit 240*b* of the first internal register 230*a*; with the second controller 210*b*, and specifically, the serial interface 220*b*, updating the internal register bit 242*b* of the second internal register 230*b* to indicate the arbitration status of the first controller 210*a* with respect to the computing component 212*a*. When the second controller 210*b* determines that the internal register bit 242*b* indicates that the first controller 210*a* is accessing the serial bus 250*a* ("asserted"), the first controller 210*a* does not access the serial bus 250*a* for y seconds, at 308. For example, y seconds can be 20 microseconds or 40 microseconds e.g., based on the first controller 210*a* or the second controller 210*b*). The first controller 210*a* can determine if the internal register bit 240*b* indicates that the second controller 210*b* is not accessing the serial bus 250*a* ("de-asserted"), at 310. When the first controller 210*a* determines that the internal register bit 240*b* indicates that the second controller 210*b* is not accessing the serial bus 250*a* ("de-asserted"), the first controller 210*a* toggles the internal register bit 240*a* to access the serial bus 250*a* ("asserted"), at 312.

When the first controller 210*a* determines that the internal register bit 240*b* indicates that the second controller 210*b* is accessing the serial bus 250*a* ("de-asserted"), the first controller 210*a* can wait for a period of time (e.g., 2 seconds) and attempt to again determine whether the internal register bit 240*b* indicates that the second controller 210*b* is accessing the serial bus 250*a* ("de-asserted"), at 314. When the first controller 210 waits for greater than the period of time (e.g., 2 seconds), the process fails, at 316. When the first controller 210 waits less than the period of time, the method returns to step 302.

When the second controller 210*a* determines that the internal register bit 242*b* indicates that the first controller 210*a* is not accessing the serial bus 250*a* ("de-asserted") (at 306), the process fails, at 316.

When the first controller 210*a* determines that the internal register bit 240*b* indicates that the second controller 210*b* is accessing the serial bus 250*a* ("de-asserted") (at 310), the process returns to step 302.

Figure 4:
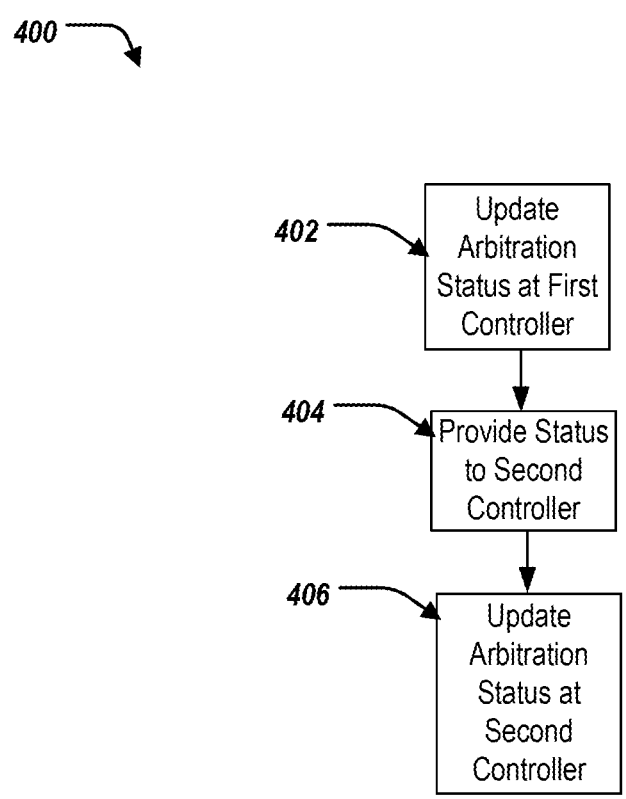

In some examples, a method of arbitrating serial bus access to computing components of the information handling system is described in U.S. Pat. No. 7,380,043, which is incorporated herein by reference FIG. 4 illustrates a flowchart depicting selected elements of an embodiment of a method 400 for arbitrating serial bus access to computing components of the information handling system. The method 400 may be performed by the information handling system 100, the information handling systems 202 and/or the controllers 210, and with reference to FIGS. 1-2. It is noted that certain operations described in method 400 may be optional or may be rearranged in different embodiments.

The first controller 210*a* updates the arbitration status of the internal register bit 240*a*, at 402. The first controller 210*a*, and in particular the serial interface 220*a*, provides to the second controller 210*b*, the status of the internal register bit 240*a* (and/or the status of the first register 230*a*) via the arbitration serial bus 260, at 404. The second controller 210*b*, and in particular, the serial interface 220*b*, updates the status of the internal register bit 242*a* based on the received status of the internal register bit 240*a*, at 406.

Figure 5:
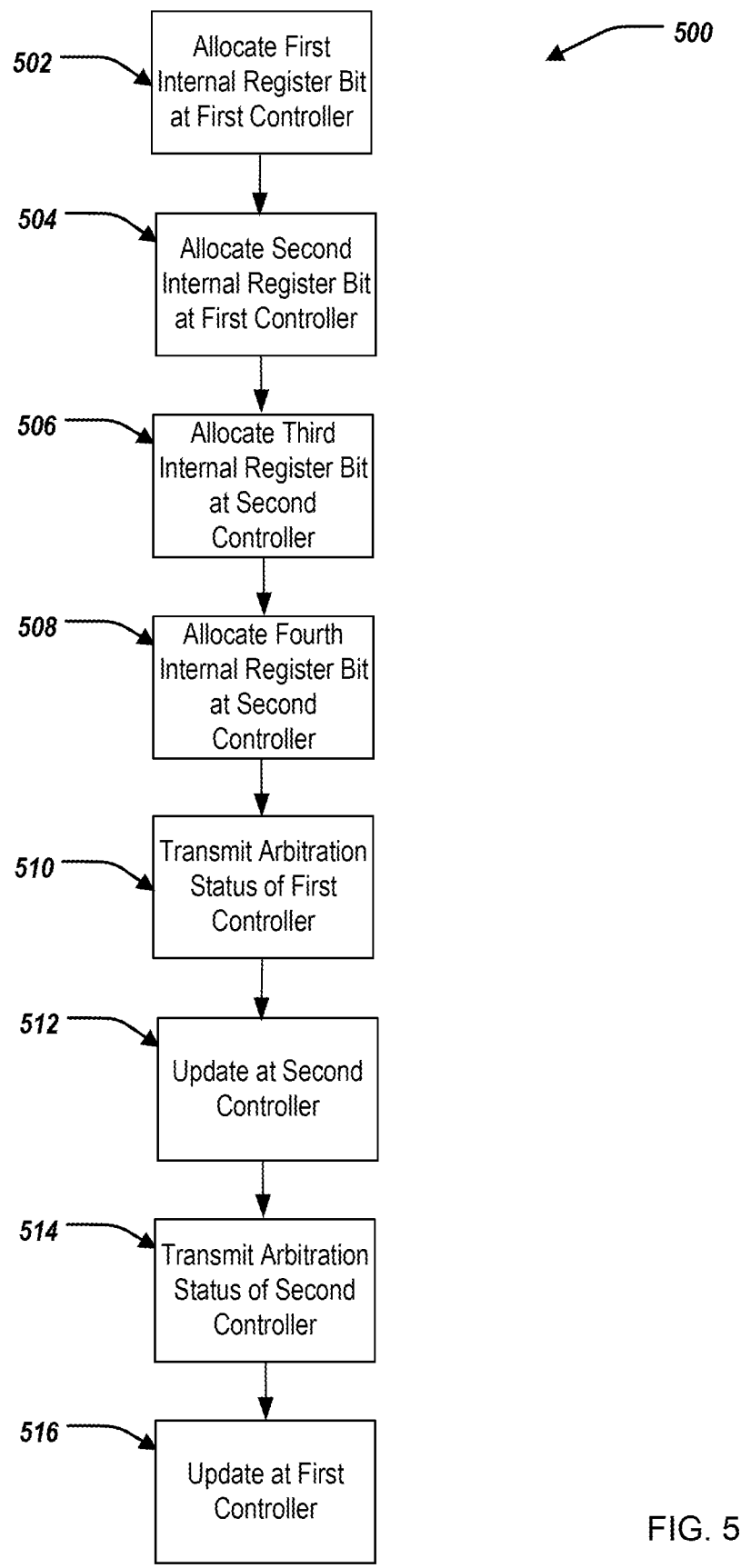

FIG. 5 illustrates a flowchart depicting selected elements of an embodiment of a method 300 for arbitrating serial bus access to computing components of the information handling system. The method 500 may be performed by the information handling system 100, the information handling systems 202 and/or the controllers 210, and with reference to FIGS. 1-2. It is noted that certain operations described in method 300 may be optional or may be rearranged in different embodiments.

The first controller 210a allocates internal register bit 240a of the first register 230a indicating an arbitration status of the first controller 210a with respect to the computing device 212a, at 502. The first controller 210a allocates the internal register bit 240b of the first register 230a indicating an arbitration status of the second controller 210b with respect to the computing device 212a, at 504. The second controller 210b allocates the internal register bit 242a of the second register 230b indicating the arbitration status of the first controller 210a with respect to the computing device 212a, at 506. The second controller 210b allocates the internal register bit 242b of the second register 230b indicating the arbitration status of the second controller 210b with respect to the computing device 212a, at 508. The first controller 210a transmits, to the second controller 210b over the arbitration serial bus 260, the arbitration status of the first controller 210a with respect to the computing device 212a as indicated by the internal register bit 240a of the first register 230a, at 510. The second controller 210b updates, based on the internal register bit 240a of the first register 230a, the internal register bit 242a of the second register 230b indicating the arbitration status of the first controller 210a with respect to the computing device 212a, at 512. The second controller 210b transmits, to the first controller 210a over the arbitration serial bus 260, the arbitration status of the second controller 210b with respect to the computing device 212a as indicated by the internal register bit 242b of the second register 230b, at 514. The first controller 210a updates, based on the internal register bit 242b of the second register 230b, the internal register bit 240b of the first register 230a indicating the arbitration status of the second controller 210b with respect to the computing device 212b, at 516.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   identifying a first controller and a second controller each connected to a computing device over a first serial bus for monitoring of the computing device;
   allocating, at the first controller, i) a first internal register bit of a first register indicating an arbitration status of the first controller with respect to the computing device and ii) a second internal register bit of the first register indicating an arbitration status of the second controller with respect to the computing device;
   allocating, at the second controller, i) a third internal register bit of a second register indicating the arbitration status of the first controller with respect to the computing device and ii) a fourth internal register bit of the second register indicating the arbitration status of the second controller with respect to the computing device;
   transmitting, by the first controller and to the second controller over a second serial bus, the arbitration status of the first controller with respect to the computing device as indicated by the first internal register bit of the first register;
   updating, at the second controller and based on the first internal register bit of the first register, the third internal register bit of the second register indicating the arbitration status of the first controller with respect to the computing device;
   transmitting, by the second controller and to the first controller over the second serial bus, the arbitration status of the second controller with respect to the computing device as indicated by the fourth internal register bit of the second register; and
   updating, at the first controller and based on the fourth internal bit of the second register, the second internal register bit of the first register indicating the arbitration status of the second controller with respect to the computing device.

2. The computer-implemented method of claim 1, wherein the first controller and the second controller are each connected to an additional computing device over a third serial bus for monitoring of the additional computing device, the method further comprising:
   allocating, at the first controller, i) a fifth internal register bit of the first register indicating an arbitration status of the first controller with respect to the additional computing device and ii) a sixth internal register bit of the first register indicating an arbitration status of the second controller with respect to the additional computing device;
   allocating, at the second controller, i) a seventh internal register bit of the second register indicating the arbitration status of the first controller with respect to the additional computing device and ii) an eighth internal register bit of the second register indicating the arbitration status of the second controller with respect to the additional computing device;

transmitting, by the first controller and to the second controller over the second serial bus, the arbitration status of the first controller with respect to the additional computing device as indicated by the fifth internal register bit of the first register;

updating, at the second controller and based on the fifth internal register bit of the first register, the seventh internal register bit of the second register indicating the arbitration status of the first controller with respect to the additional computing device;

transmitting, by the second controller and to the first controller over the second serial bus, the arbitration status of the second controller with respect to the additional computing device as indicated by the eighth internal register bit of the second register; and updating, at the first controller and based on the eighth internal bit of the second register, the sixth internal register bit of the first register indicating the arbitration status of the second controller with respect to the additional computing device.

3. The computer-implemented method of claim 1, wherein the arbitration status of the first controller with respect to the computing device is an arbitration out status of the first controller for access to the computing device over the first serial bus.

4. The computer-implemented method of claim 1, wherein the arbitration status of the second controller with respect to the computing device is an arbitration out status of the second controller for access to the computing device over the first serial bus.

5. The computer-implemented method of claim 1, further comprising:
   accessing, by the first controller and over the first serial bus, the computing device based on the first internal register bit and the second internal register bit of the first register.

6. The computer-implemented method of claim 1, further comprising:
   accessing, by the second controller and over the first serial bus, the computing device based on the third internal register bit and the fourth internal register bit of the second register.

7. The computer-implemented method of claim 1, wherein the second serial bus is a shared serial bus between the first controller and the second controller.

8. An information handling system comprising a processor having access to memory media storing instructions executable by the processor to perform operations comprising:
   identifying a first controller and a second controller each connected to a computing device over a first serial bus for monitoring of the computing device;
   allocating, at the first controller, i) a first internal register bit of a first register indicating an arbitration status of the first controller with respect to the computing device and ii) a second internal register bit of the first register indicating an arbitration status of the second controller with respect to the computing device;
   allocating, at the second controller, i) a third internal register hit of a second register indicating the arbitration status of the first controller with respect to the computing device and ii) a fourth internal register bit of the second register indicating the arbitration status of the second controller with respect to the computing device;
   transmitting, by the first controller and to the second controller over a second serial bus, the arbitration status of the first controller with respect to the computing device as indicated by the first internal register bit of the first register;
   updating, at the second controller and based on the first internal register bit of the first register, the third internal register bit of the second register indicating the arbitration status of the first controller with respect to the computing device;
   transmitting, by the second controller and to the first controller over the second serial bus, the arbitration status of the second controller with respect to the computing device as indicated by the fourth internal register bit of the second register; and
   updating, at the first controller and based on the fourth internal bit of the second register, the second internal register bit of the first register indicating the arbitration status of the second controller with respect to the computing device.

9. The information handling system of claim 8, wherein the first controller and the second controller are each connected to an additional computing device over a third serial bus for monitoring of the additional computing device, the operations further comprising:
   allocating, at the first controller, i) a fifth internal register bit of the first register indicating an arbitration status of the first controller with respect to the additional computing device and ii) a sixth internal register bit of the first register indicating an arbitration status of the second controller with respect to the additional computing device;
   allocating, at the second controller, i) a seventh internal register bit of the second register indicating the arbitration status of the first controller with respect to the additional computing device and ii) an eighth internal register bit of the second register indicating the arbitration status of the second controller with respect to the additional computing device;
   transmitting, by the first controller and to the second controller over the second serial bus, the arbitration status of the first controller with respect to the additional computing device as indicated by the fifth internal register bit of the first register;
   updating, at the second controller and based on the fifth internal register bit of the first register, the seventh internal register bit of the second register indicating the arbitration status of the first controller with respect to the additional computing device;
   transmitting, by the second controller and to the first controller over the second serial bus, the arbitration status of the second controller with respect to the additional computing device as indicated by the eighth internal register bit of the second register; and
   updating, at the first controller and based on the eighth internal bit of the second register, the sixth internal register bit of the first register indicating the arbitration status of the second controller with respect to the additional computing device.

10. The information handling system of claim 8, wherein the arbitration status of the first controller with respect to the computing device is an arbitration out status of the first controller for access to the computing device over the first serial bus.

11. The information handling system of claim 8, wherein the arbitration status of the second controller with respect to the computing device is an arbitration out status of the second controller for access to the computing device over the first serial bus.

12. The information handling system of claim 8, the operations further comprising:
  accessing, by the first controller and over the first serial bus, the computing device based on the first internal register bit and the second internal register bit of the first register.

13. The information handling system of claim 8, the operations further comprising:
  accessing, by the second controller and over the first serial bus, the computing device based on the third internal register bit and the fourth internal register bit of the second register.

14. The information handling system of claim 8, wherein the second serial bus is a shared serial bus between the first controller and the second controller.

15. A non-transitory computer-readable medium storing software comprising instructions executable by one or more computers which, upon such execution, cause the one or more computers to perform operations comprising:
  identifying a first controller and a second controller each connected to a computing device over a first serial bus for monitoring of the computing device;
  allocating, at the first controller, i) a first internal register bit of a first register indicating an arbitration status of the first controller with respect to the computing device and ii) a second internal register bit of the first register indicating an arbitration status of the second controller with respect to the computing device;
  allocating, at the second controller, i) a third internal register bit of a second register indicating the arbitration status of the first controller with respect to the computing device and ii) a fourth internal register bit of the second register indicating the arbitration status of the second controller with respect to the computing device;
  transmitting, by the first controller and to the second controller over a second serial bus, the arbitration status of the first controller with respect to the computing device as indicated by the first internal register bit of the first register;
  updating, at the second controller and based on the first internal register bit of the first register, the third internal register bit of the second register indicating the arbitration status of the first controller with respect to the computing device;
  transmitting, by the second controller and to the first controller over the second serial bus, the arbitration status of the second controller with respect to the computing device as indicated by the fourth internal register bit of the second register; and
  updating, at the first controller and based on the fourth internal bit of the second register, the second internal register bit of the first register indicating the arbitration status of the second controller with respect to the computing device.

16. The computer-readable medium of claim 15, wherein the first controller and the second controller are each connected to an additional computing device over a third serial bus for monitoring of the additional computing device, the operations further comprising:
  allocating, at the first controller, i) a fifth internal register bit of the first register indicating an arbitration status of the first controller with respect to the additional computing device and ii) a sixth internal register bit of the first register indicating an arbitration status of the second controller with respect to the additional computing device;
  allocating, at the second controller, i) a seventh internal register bit of the second register indicating the arbitration status of the first controller with respect to the additional computing device and ii) an eighth internal register bit of the second register indicating the arbitration status of the second controller with respect to the additional computing device;
  transmitting, by the first controller and to the second controller over the second serial bus, the arbitration status of the first controller with respect to the additional computing device as indicated by the fifth internal register bit of the first register;
  updating, at the second controller and based on the fifth internal register bit of the first register, the seventh internal register bit of the second register indicating the arbitration status of the first controller with respect to the additional computing device;
  transmitting, by the second controller and to the first controller over the second serial bus, the arbitration status of the second controller with respect to the additional computing device as indicated by the eighth internal register bit of the second register; and
  updating, at the first controller and based on the eighth internal bit of the second register, the sixth internal register bit of the first register indicating the arbitration status of the second controller with respect to the additional computing device.

17. The computer-readable medium of claim 15, wherein the arbitration status of the first controller with respect to the computing device is an arbitration out status of the first controller for access to the computing device over the first serial bus.

18. The computer-readable medium of claim 15, wherein the arbitration status of the second controller with respect to the computing device is an arbitration out status of the second controller for access to the computing device over the first serial bus.

19. The computer-readable medium of claim 15, the operations further comprising:
  accessing, by the first controller and over the first serial bus, the computing device based on the first internal register bit and the second internal register bit of the first register.

20. The computer-readable medium of claim 15, the operations further comprising:
  accessing, by the second controller and over the first serial bus, the computing device based on the third internal register bit and the fourth internal register bit of the second register.

* * * * *